United States Patent [19]

Schweig et al.

[11] 4,293,731

[45] Oct. 6, 1981

[54] SOLAR GENERATOR, ESPECIALLY FOR SPACE CRAFT

[75] Inventors: Helmut Schweig, Hoehenkirchen; Henning von Bassewitz, Munich, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 155,649

[22] Filed: Jun. 2, 1980

[30] Foreign Application Priority Data

Jun. 9, 1979 [DE] Fed. Rep. of Germany ....... 2923535

[51] Int. Cl.³ .......................................... H01L 31/04
[52] U.S. Cl. .................................. 136/245; 136/292; 244/173
[58] Field of Search ................. 136/245, 292; 244/173

[56] References Cited

U.S. PATENT DOCUMENTS 4,101,101  7/1978  Barkats et al. ...................... 244/173

OTHER PUBLICATIONS

R. V. Elms, Jr., "Family of Solar Array Design Options,", *Conf. Record, 13th IEEE Photovoltaic Specialists Conf.* (1978), pp. 208–214.

*Primary Examiner*—Aaron Weisstuch
*Attorney, Agent, or Firm*—W. G. Fasse; D. F. Gould

[57] ABSTRACT

A plurality of lightweight sheets or panels are assembled to form a solar generator, especially for space craft. The panels or sheets which carry the solar cells, are made of fiber compound materials and are secured to a frame structure made of lightweight tubular members. Tensioning elements are operatively interposed between the frame structure and the panel sheets. The corners of the frame structures are provided with connecting elements so that several frames may be interconnected to form still larger assemblies. These assemblies may be folded and unfolded as desired.

16 Claims, 6 Drawing Figures

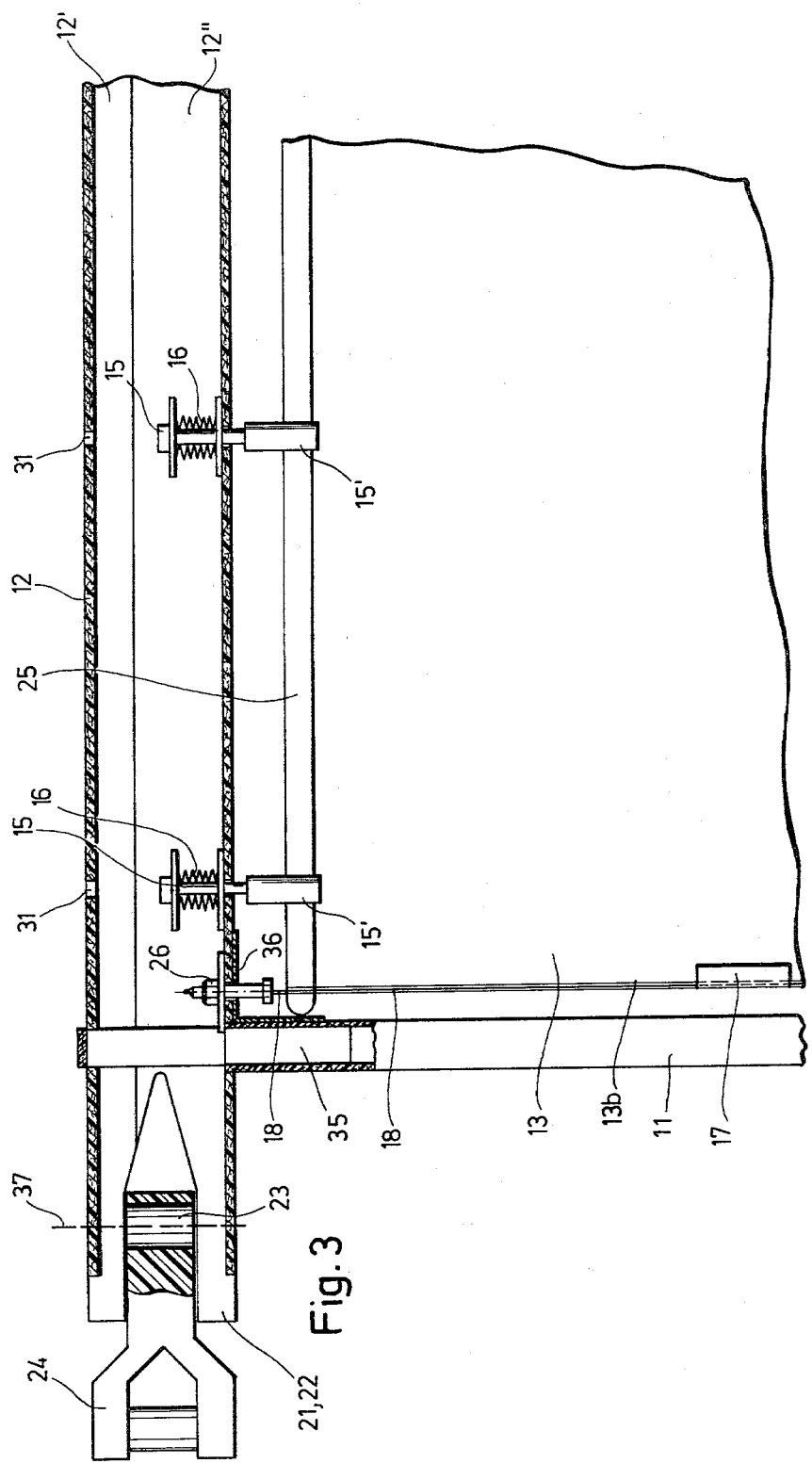

SOLAR GENERATOR, ESPECIALLY FOR SPACE CRAFT

BACKGROUND OF THE INVENTION

The invention relates to a solar generator, especially for space craft comprising a plurality of flexible panels or sheets to which the individual solar cells are secured.

Such solar generators are known in the art. For example, German Patent Publication (DE-OS) 2,545,911 illustrates a rotating space craft body comprising several flexible screens to which the solar cells are secured. The screens may be brought from a folded up position into a stretched out or fanned out position. The screen or umbrella ends are equipped with boxes which take up the flexible screens in the folded up condition. These boxes are brought into the unfolding position by centrifugal force whereby the screens or umbrellas are opened up. The movement of the boxes is controlled by extendable carriers.

German Patent Publication (DE-OS) 2,252,093 discloses an arrangement functioning and constructed similarly to the above discussed prior art structure. In German Patent Publication 2,252,093 the screens or umbrellas which carry the solar cells are pulled into a packaging container and the screens are stretched out between frame components which are tilted outwardly or which are extended by parallel displacement. These frame components form the cover of the packaging container.

Both arrangements of the prior art mentioned above have a relatively heavy structure which additionally requires many guide elements which are continuously subject to the danger of canting and jamming.

Another arrangement of the prior art is disclosed in U.S. Pat. No. 3,544,041. In this arrangement the solar cells are also secured to a flexible membrane or to a flexible sheet of plastics material. The longitudinal ends of the sheets are clamped into clamping moldings. However, no stiffening elements are provided along the longitudinal edges of the screens so that, although some weight is saved, a trouble-free unfolding of the screens is not assured. Especially, the maintaining of a working position with due regard to the angular location of the screens may cause difficulties. Due to such difficulties, prior art solar generators have been constructed heretofore only for outputs up to 2 kw.

OBJECTS OF THE INVENTION

In view of the above it is the aim of the invention to achieve the following objects singly or in combination:

to construct a solar generator, especially for use on a space craft so that it will be substantially lighter than prior art structures to thereby increase the total power output of such generator;

to use lightweight, hollow tubular components of fiber compound material for making the frame structures;

to provide the corners of the frame structures with interlocking connecting elements so that a plurality of frame structures may be assembled into larger solar generator units; and to substantially increase the power collecting ability of such generators, for example, to five times that of prior art generators.

SUMMARY OF THE INVENTION

According to the invention there is provided a solar generator which comprises flexible panel means and solar cells secured to the flexible panel means. The panels or sheets are secured to frames for holding the panels. The frames comprise longitudinal bars and crossbars made of fiber compound materials. Each frame encloses a flexible panel and adjustable tensioning means connect the flexible panels to the frames in an operative manner. Preferably, the longitudinal bars and the crossbars are hollow.

BRIEF FIGURE DESCRIPTION

In order that the invention may be clearly understood, it will now be described, by way of example, with reference to the accompanying drawings, wherein:

FIG. 3 shows a sectional view of an enlarged detail shown at X1 in FIG. 1, whereby the section extends in the plane of FIG. 1;

DETAILED DESCRIPTION OF PREFERRED EXAMPLE EMBODIMENTS AND OF THE BEST MODE OF THE INVENTION

Figure 1:
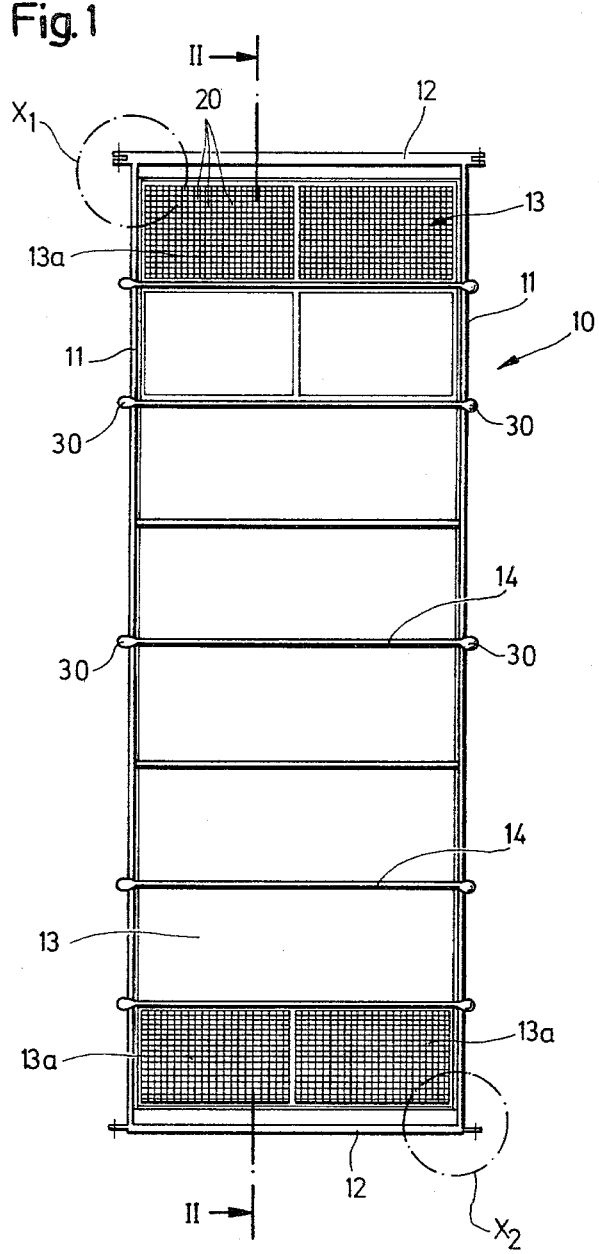
FIG. 1 is an elevational view of a solar generator panel assembly according to the invention in its extended condition.

FIG. 1 shows an elevational view of a solar generator unit 10 comprising a frame structure of longitudinal bars 11 and horizontal crossbars 12 to form a substantially rectangular closed frame structure in which the solar panels 13 are operatively held under an adjustable bias tension to be described below. The flexible panels or sheets 13 may be subdivided by auxiliary support bars 14 extending horizontally across the panels or sheets 13 and connected at their ends 30 to the vertical or longitudinal support bars 11.

Each panel or sheet 13 may be further subdivided into panel components 13a and each of the panels or panel components has attached thereto by conventional means a plurality of solar cells 20.

In actual construction the panel or sheet 13 is subdivided merely by securing the auxiliary crossbars 14 and possibly also vertical crossbars to a single continuous panel which may be a flexible sheet of carbon fibers. The panels 13 may also be made of a continuous film or foil of so-called "Kapton" material reinforced by a carbon fiber webbing. Incidentally, "Kapton" is a trade name designating a polyimide foil by the Dupont Company.

Figure 2:
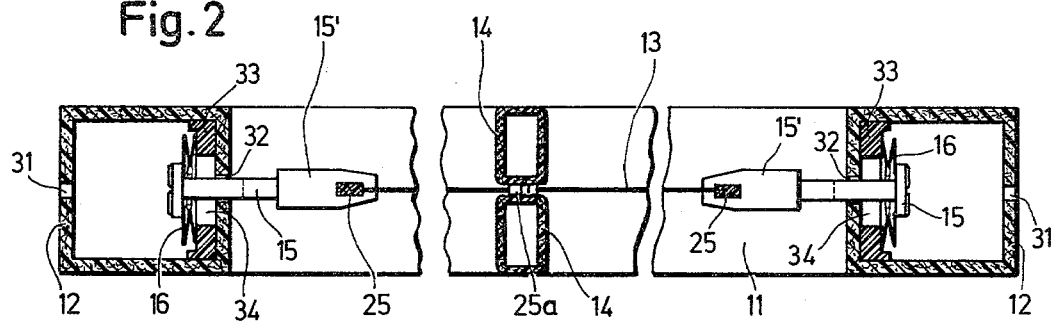
FIG. 2 illustrates a sectional view along section line II—II in FIG. 1.

Referring to FIGS. 2 and 3, the sheets 13 have reinforced upper and lower edges 25. The reinforcement may be accomplished by a carbon fiber webbing. It is also possible to reinforce the lateral edges 13b of the sheet, for example, by carbon fiber strands.

A plurality of shackles 15' are secured to the reinforced edges 25 of the sheet 13. These shackles have threaded holes into which a tensioning bolt 15 extends which is adjustable by a tool insertable through the holes 31. Proper tensioning is accomplished by sets of cup or Belleville springs 16. These springs are so arranged that they even compensate for deformations of the frame structure 11, 12. The upper and lower crossbars 12 are provided with a longitudinal slot 32 facing the reinforced edge of the sheet and extending from end to end. Prior to securing the sheet to the crossbars 12, the tensioning means 15, 16 are assembled on a rail 33 which is then inserted lengthwise into the hollow crossbars 12 with the shafts of the adjustment screws 15 extending through the respective slot 32. Holes 34 in the rail 33 are spaced from one another along the length of the rail 33 so as to align with the holes 31 when the rail 33 is fully inserted into the crossbars 12. The rail 33 is not necessary if the crossbars are made up of two separate channel members which may be connected, for example, along flanges not shown in FIG. 3 for simplicity's sake. However, FIG. 3 does show that the crossbar 12 comprises an upper channel member 12' and a lower channel member 12''. The upper channel member 12' may form a cover for the lower channel member 12'' after the tensioning means 15, 16 have been properly secured.

FIG. 3 further shows that a stay or guy wire or cable 18 extends along the reinforced lateral edge or edges 13b of the sheets 13. These wires or cables 18 are also secured to tensioning means 26 and are preferably guided through guide shackle members 17 secured to the edge of the sheets 13 at spaced intervals.

Incidentally, the sheet 13 may also be reinforced by carbon fibers as shown at 25a where the auxiliary crossbars 14 extend across the sheets, as best seen in FIG. 2. Further, the edges 25 can be reinforced by bending over a portion of the sheet rather than by reinforcing it with a carbon fiber webbing.

The lateral ends 30 of the auxiliary crossbars 14 are operatively secured by conventional means to the longitudinal bars 11 which in turn are secured to the upper and lower crossbars 12, for example, by a plug-in type of connection 35 shown in FIG. 3. Additional reinforcement brackets 36 may also be provided in the corners between the longitudinal and horizontal frame bars 11 and 12.

Figure 5:
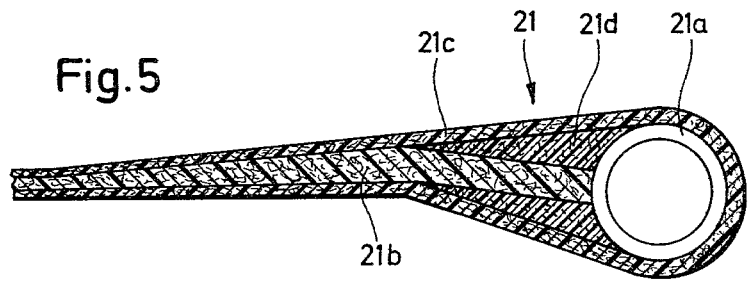
FIG. 5 is a sectional view of a detail as shown at X2 in FIG. 1 on an enlarged scale showing the section of a lateral end of a crossbar, whereby the section extends in a plane perpendicularly to the plane of FIG. 1.
Figure 6:
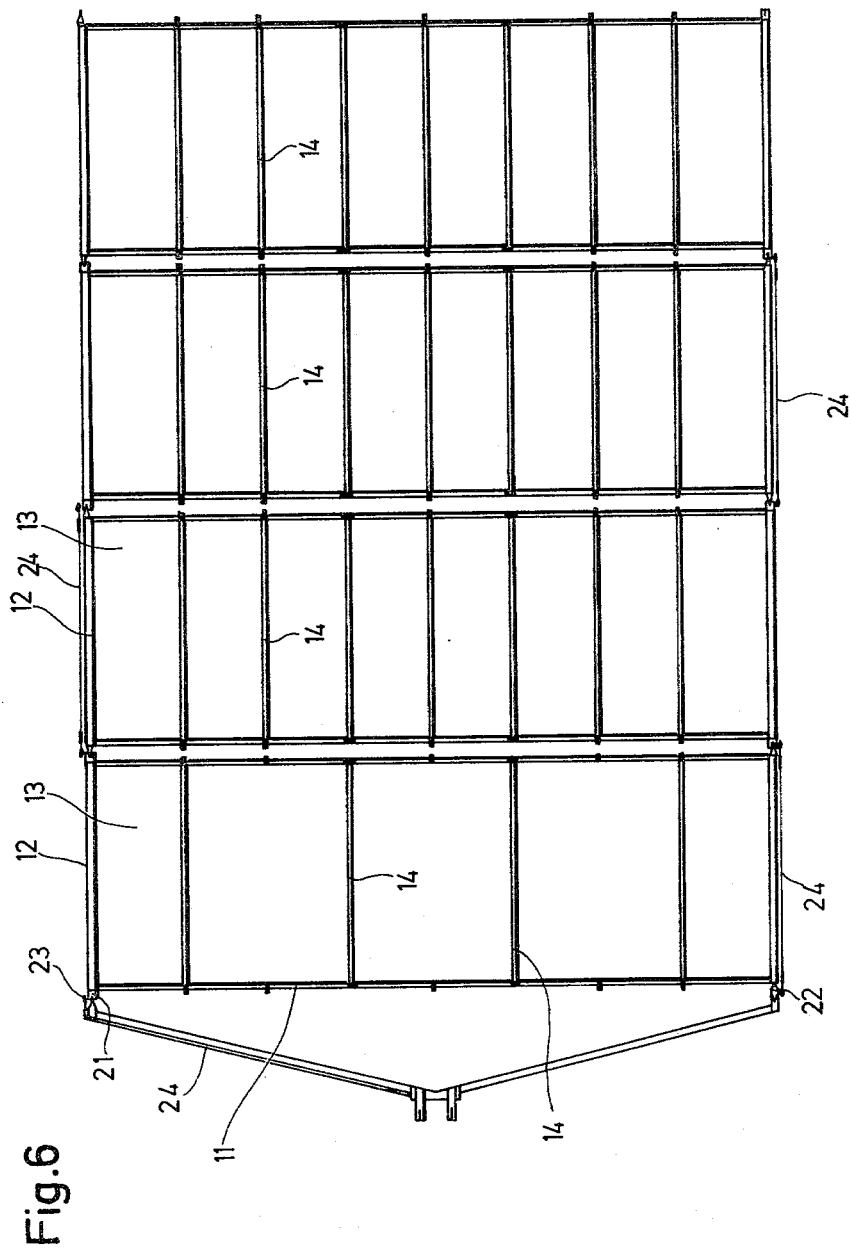
FIG. 6 shows the assembly of a solar generator according to the invention comprising a plurality of panel units.

Referring further to FIG. 3 and to FIG. 5 the crossbars 12 comprise a centering notch 22 at one end thereof and a centering member 21 as shown in FIG. 5 at the opposite end thereof. The centering members 21 comprise a bearing bushing 21a at one end thereof resting against a compression core 21b and held in position by an outer envelope 21c. The envelope 21c is made of fiber compound materials in which the fibers extend unidirectionally in the direction of the longitudinal axis of the crossbars 12. The lefthand end of the connecting and centering elements 21 may be tapered or otherwise provided with means for securing these connecting elements to the crossbars 12. Adjacent to the bearing bushing 21a and between the compression core 21b and the outer envelope 21c there may be inserted a filler material 21d in which the direction of the fibers extends perpendicularly to the direction of the fibers of the pressure core 21b. The end of the connecting element 21 which holds the bearing bushing 21a is so shaped so as to be received in the notch 22. Due to the tapering of the inner ends of the notch 22 a proper centering is accomplished and a bolt 37 merely indicated by a dashed line in FIG. 3 will extend through the notch and through the bearing bushing 21a. Thus, it is possible to assemble a plurality of such frames holding respective panels or sheets into a larger assembly as shown in FIG. 6. Tilting levers 24 may be also secured to these connecting elements 21, 22 by means of bolts 23 as schematically illustrated in FIG. 6 and 3.

The frame components 11 and 12 as well as 14 of the frame 10 are made of fiber compound materials such as graphite epoxy whereby the fiber direction extends in the direction of the force which is effective on the frame structure. The crossbars 12 and the auxiliary crossbars 14 have preferably a rectangular or square cross-section, whereas the longitudinal bars 11 may have a round cross-section for practical purposes. However, the invention is not limited to such examples.

Figure 4:
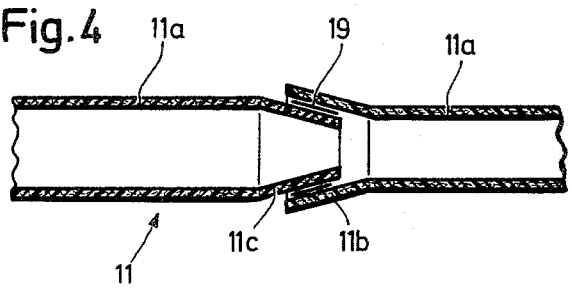
FIG. 4 is a sectional view through a connection between two longitudinal bar elements.

FIG. 4 shows that the longitudinal bars 11 may be made up of a plurality of bar components or elements 11a provided, for example, at one end thereof with a female type of socket 11b and at the other end thereof with a male type of plug 11c. Further reinforcement may be achieved by inserting a suitable adhesive 19 in the plug and socket connection.

It has been found that with the stay wires 18 and the adjustable tensioning means 26 as shown in FIG. 3 it is possible to properly bias even the lateral edges 13b of the sheets 13. Surprisingly, such a tensioning although primarily effective in the longitudinal direction of the bars 11, is also effective to sufficiently bias the sheets in the cross-direction, namely, in the direction of the bars 12 and 14.

Incidentally, the above mentioned film of "Kapton" has preferably a thickness of 25μ and is reinforced by a carbon fiber webbing. As mentioned, such webbings may also be used to reinforce the edges 13b, and 25.

The just described features have made it possible to construct a solar generator which is substantially lighter in weight than prior art structures by a factor of almost two. The biasing loads which may be adjusted by the tensioning means 15 and 26 and which may be influenced by the springs 16 are freely selectable in accordance with the individual requirements of the type of sheet used. Further, by reducing the weight of the entire structure it has been possible to assemble solar generators having an upper limit collection value in the order of about 10 kw.

Although the invention has been described with reference to specific example embodiments, it will be appreciated, that it is intended, to cover all modifications and equivalents within the scope of the appended claims.

What is claimed is:

1. A solar generator, comprising flexible panel means, solar cells secured to said flexible panel means, frame means for holding said panel means, said frame means (10) comprising longitudinal bars (11) made of fiber compound materials and crossbars (12) also made of fiber compound materials, each frame means enclosing one of said flexible panel means, first adjustable tensioning means operatively interposed between said crossbars and said flexible panel means for coupling said flexible panel means to said frame means at the ends of said panel, and second adjustable tensioning means comprising stay wires means coupled to the sides of said flexible panel means and adjustable biasing means (26) operatively connecting said wire means to said crossbars (12).

2. The solar generator of claim 1 further comprising guide shackle means secured to the edges of said flexible panel means for coupling said wire stay means to said flexible panel means.

3. The solar generator of claim 1, wherein said longitudinal bars comprise a plurality of bar elements (11a) and means (11b, 11c, 19) operatively interconnecting said bar elements.

4. The solar generator of claim 3, wherein said connecting means comprise male and female conical plugs and sockets and adhesive means operatively interposed between a plug and its associated socket.

5. The solar generator of claim 1, wherein said flexible panel means comprise a sheet or foil made of "Kapton" having a thickness of about 25μ and a carbon fiber webbing reinforcing said sheet or foil.

6. The solar generator of claim 1, further comprising auxiliary support means of fiber compound materials extending across said flexible panel means and wherein said flexible panel means comprises a sheet of fiber material and carbon fiber webbing reinforcing the edges of the fiber material sheet along the crossbar and along said auxiliary support means.

7. The solar generator of claim 6, further comprising means securing said auxiliary support means to said longitudinal bars, said auxiliary support means extending substantially in parallel to said crossbars.

8. The solar generator of claim 1, wherein said crossbars comprise centering means at their ends, said generator further comprising tilting bolt means (23) and tilting lever means (24), said tilting bolt means fitting into said centering means for connecting said tilting lever means to said crossbar ends.

9. The solar generator of claim 8, wherein said centering means comprise a centering piece including a bearing bushing (21a), a compression core (21b) of compound fiber material the fibers of which are arranged unidirectionally, and an envelope (21c) of carbon fiber material surrounding said bearing bushing and core.

10. The solar generator of claim 9, wherein said centering means further comprise fiber filler material (21d) surrounding said compression core, said fiber filler material having fibers extending perpendicularly to the direction of the fibers of the compression core.

11. The solar generator of claim 1, wherein said adjustable tensioning means comprise Belleville or cup spring means and threaded adjustment means supported by said Belleville or cup spring means.

12. The solar generator of claim 11, wherein said Belleville or cup spring means comprise sets of such Belleville or cup spring means for compensating deformations of said frame means.

13. The solar generator of claim 1 or 6, wherein said longitudinal bars of fiber compound material, said auxiliary support means of fiber compound material, and said crossbars of fiber compound material are all made of hollow tubular stock.

14. A solar generator, comprising a plurality of flexible panel means, solar cells secured to each of said flexible panel means, a plurality of panel frame means for holding said flexible panel means, said panel frame means (10) comprising longitudinal bars (11) made of fiber compound materials and crossbars (12) also made of fiber compound materials, each panel frame means enclosing one of said flexible panel means, first adjustable tensioning means comprising shackle means and coupling means interposed between said crossbars and said flexible panel means, second adjustable tensioning means comprising stay wire means coupled to the sides of said flexible panel means and adjustable biasing means operatively connecting said stay wire means to said crossbars, each said panel frame means comprising a plurality of auxiliary support means substantially in parallel to said crossbars and coupled to the respective longitudinal bars of the respective panel frame means, said crossbars of said plurality of panel frame means comprising complementary centering coupling means at each end thereof, said panel frame means being coupled together at said crossbars to form a solar generator frame supporting at least a row of flexible panel means in a common plane, each flexible panel being separately adjustable under tension between the crossbars in its respective panel frame whereby the flexible panels may be assembled in a lightweight frame according to the area required.

15. The solar generator as set forth in claim 14, wherein said first and second adjustable tensioning means comprise spring biased tensioning means.

16. The solar generator of claim 14, wherein the complementary coupling means formed at the ends of the crossbars of said panel frame means comprise centering notch means and centering coupling means complementary to said notch means.

* * * * *